United States Patent Office 3,778,290
Patented Dec. 11, 1973

3,778,290
DECORATIVE FLOORING SURFACES
Herbert Jackson Shearing, Manchester, England, assignor to Imperial Chemical Industries Limited, Millbank, London, England
No Drawing. Filed Mar. 11, 1971, Ser. No. 123,420
Claims priority, application Great Britain, Mar. 18, 1970, 13,041/70; Aug. 11, 1970, 38,631/70; Dec. 24, 1970, 61,328/70
Int. Cl. B44c 1/22; C04b 7/02
U.S. Cl. 117—8
11 Claims

ABSTRACT OF THE DISCLOSURE

A process for the manufacture of decorative flooring surfaces which comprises applying to the floor to be surfaced a composition having as essential ingredients a hydraulic cement, a filler in the form of fragments or coarse particles, water and an organic polyisocyanate, allowing the composition to harden and then grinding or otherwise-treating the surface of the composition to expose the fragments or particles of filler. The filler may be, for example, fragments of plastic material, glass or stone, or stone aggregate. The compositions set rapidly and the final surface is very durable.

This invention relates to floring compositions, more particularly to a process for the manufacture of cement/urethane-based flooring compositions having a decorative effect, and is an improvement in or modification of the invention described in our U.K. specification No. 1,192,864.

Said U.K. specification No. 1,192,864 describes and claims compositions having as essential ingredients a hydraulic cement, a silica filler, water and an organic compound containing a plurality of isocyanate groups.

We have now found that by using any filler (whether silica or otherwise) which is in the form of fragments or coarse particles in the above-mentioned compositions and, after spreading the composition and allowing it to harden, grinding or otherwise treating the surface of the composition to expose the fragments or particles of filler, then a terrazzo-like decorative effect is obtained.

According to the present invention there is provided a process for the manufacture of decorative flooring surfaces which comprises applying to the floor to be surfaced a composition having as essential ingredients a hydraulic cement, a filler in the form of fragments or coarse particles, water and an organic polyisocyanate, allowing the said composition to harden and then grinding or otherwise treating the surface of the composition to expose the fragments or particles of filler.

The filler may be in the form of mass-pigmented plastic fragments of thermoplastic or thermosetting polymers or copolymers, for example, nylon polymers, polyvinyl chloride, polyvinyl chloride/polyvinyl acetate copolymers, urea/formaldehyde polymers, phenol/formaldehyde polymers, melamine/formaldehyde polymers, acetal polymers and copolymers, acrylic polymers and copolymers, acrylonitrile/butadiene/styrene terpolymers, Cellulose acetate butyrate, polycarbonates, polyethylene terephthalates, polystyrenes, polyurethanes, polyethylenes and polypropylenes.

The mass-pigmented plastic may be in the form of chips or turnings and is conveniently the plastic waste resulting from the trimming of injection moulded articles or from other moulding processes.

Other fillers which may be used include materials selected from glass and stone fragments and stone aggregate. The glass fragments may be colourless or coloured. The stone, either in the form of fragments or aggregate, may be used in its natural colour or it may be artificially coloured, for example, by the application of a dyestuff or pigment to the surface. Provided that the hardened compositions which are obtained by using these artificially coloured materials are only lightly ground, the surface colouring remains essentially intact.

Colourless plastic fragments may also be used as the filler. By fragments or particles we mean those materials having a particle size not less than about 60 B.S. sieve size.

The term "hydraulic cement" is used in its usual sense to denote the class of structural materials which are applied in admixture with water and thereafter harden or set as a result of physical or chemical changes which consume the water present. As well as portland cement, it includes:

(1) Rapid hardening cements, as characterised by those with high alumina contents.
(2) Low-heat cements as characterised by high percentages of dicalcium silicate and tetracalcium alumino ferrite and low percentages of tricalcium silicate and tricalcium aluminate.
(3) Sulphate resisting cements as characterised by unusually high percentages of tricalcium silicate and dicalcium silicate and unusually low percentages of tricalcium aluminate and tetracalcium alumino ferrite.
(4) Portland blast-furnace cement as characterised by a mixture of portland cement clinker and granulated slag.
(5) Masonry cements as characterised by mixtures of portland cement and one or more of the following: hydrated lime, granulated slag, pulverised lime, colloidal clay, diatomaceous earth or other finely divided forms of silica, calcium stearate and paraffin.
(6) Natural cements as characterised by material obtained from deposits in the Lehigh Valley, U.S.A.
(7) Lime cements as characterized by oxide of calcium in its pure or impure forms and whether containing or not some argillaceous material.
(8) Selenitic cement as characterized by the addition of 5–10% of plaster of Paris to lime.
(9) Pozzolanic cement as characterised by the mixture of pozzolana, trass kieselguhr, pumice, tufa, santorin earth or granulated slag with lime mortar.
(10) Calcium sulphate cements as characterized by those depending on the hydration of calcium sulphate and includes plaster of Paris, Keene's cement and Parian cement.

Good decorative effects are obtained by the use of white Portland cement, which is a portland cement having a low iron oxide content.

As organic polyisocyanates which may be used, there may be mentioned tolylene diisocyanate and diphenyl methane diisocyanate, including the diphenylmethane diisocyanate-containing compositions known as "crude MDI," which is obtained by phosgenating the crude diamino diphenylmethane which is prepared by condensing formaldehyde and aniline in the presence of hydrochloric acid, but particularly valuable results can be obtained by the use of aliphatic, araliphatic or cycloaliphatic polyisocyanates in the said composition.

As examples of aliphatic, araliphatic or cycloaliphatic polyisocyanates which may be used, there may be mentioned polyalkylene diisocyanates, e.g. hexamethylene and 2,2,4- and 2,4,4-trimethyl hexamethylene diisocyanates, dicyclohexyl methane diisocyanates, 3-isocyanatomethyl-3,5,5-trimethylcyclohexyl isocyanate and xylylene diisocyanate; also the reaction products of an excess of any of the above diisocyanates with polyfunctional isocyanate-reactive compounds, e.g. glycols, higher polyhydric alcohols, aminoalcohols or polyamines, hydroxyl-ended polyesters, polyesteramides or polyethers, or with water, (whereby polyisocyanate biurets are formed); also uretedione or isocyanurate polymers of the above-mentioned polyisocyanates.

Although the polyisocyanate may be used in the absence of any other isocyanate-reactive compound except the water which is an essential ingredient of the compositions used in the process of the invention, it is preferred to add also an isocyanate-reactive organic compound to the compositions, as shrinkage on setting of the compositions is thereby reduced. As examples of the isocyanate-reactive organic compound which may be used there may be mentioned polyhydric alcohols, aminoalcohols, polyamines, hydroxyl-ended polyesters and polyesteramides and drying oil and non-drying oil modified alkyd resins, but it is preferred to use a dihydric or trihydric polyether having an equivalent weight of from 100 to 1500 or the products obtained by high temperature reaction between castor oil and hard resins, defined as products which are obtained by heating castor oil with a resin which is a rosinate of a metal selected from Group IIa of the Periodic Table or a condensation product of rosin with (i) at least one polyhydric alcohol, or
(ii) at least one polyhydric alcohol and at least one optionally substituted phenol/formaldehyde resol resin, or
(iii) at least one polyhydric alcohol and at least one $\alpha,\beta$-unsaturated dicarboxylic acid or the anhydride thereof.

By Periodic Table is meant the long form of the table as described in for example, page 30 of Advanced Inorganic Chemistry by F. A. Cotton and G. Wilkinson, published in 1962 by Interscience Publishers. As examples of rosinates of metals selected from Group IIa of the Periodic Table which may be reacted with castor oil there may be mentioned calcium rosinate and barium rosinate.

As examples of polyhydric alcohols which may be condensed with rosin, either alone or together with an optionally substituted phenol/formaldehyde resol resin or an $\alpha,\beta$-unsaturated dicarboxylic acid or the anhydride thereof, there may be mentioned glycerol, pentaerythritol, trimethylolpropane and sorbitol.

By resol resins we mean the alkaline catalysed reaction products of one mole of a phenol with at least one mole of formaldehyde. The most commonly used and preferred phenol for use in the preparation of resol resins is phenol itself, but other phenols and alkyl substituted phenols, for example, p-butylphenol, p-octylphenol and p-alkyl substituted phenols generally may also be used.

As examples of $\alpha,\beta$-unsaturated dicarboxylic acids and anhydrides thereof which may be condensed with rosin together with a polyhydric alcohol as defined above there may be mentioned maleic acid, fumaric acid and maleic anhydride.

The reaction of the castor oil with the resin as defined above is carried out at a high temperature for example, at 235–240° C. for a time of from ½ to 2 hours.

The castor oil and resin may be used in the proportion of from 99:1 to 1:99 parts by weight, the preferred range being from 95:5 to 20:80 parts by weight.

The compositions which are used in the present process may also contain pigments. By a suitable choice of colours between the pigments and the filler, the surface grinding operation reveals the latter embedded in a matrix of contrasting colour. In this way, a multitude of different colour combinations is possible. More than one colour of filler may be used in a single composition.

Although in most instances the bulk of the filler used in the compositions normally consists of materials in the form of fragments or coarse particles, there may also be included amounts of fine sand or any of the fine particle-size fillers mentioned in our copending application No. 13,040/70 with much smaller amounts of fragmentary or coarsely particulate filler in order to produce different fillers or sand should not exceed 50 times the weight of fragmentary or coarsely particulate filler which is used in the composition, and preferably does not exceed 25 times this weight.

The compositions may also contain bitumen, as described in our copending application No. 13,038/70, when the cement/urethane matrix in which the filler is embedded has a very dark colour. By using brightly-coloured filler in such a matrix, very striking effects can be obtained.

Solvents and thinners may also be used in making up the compositions which are used in the process, in order to assist in incorporating ingredients which may be too viscous to use easily as they are, to improve compatability between components of the mixture or to render the compositions of the requisite viscosity to be self-levelling or to be spread easily by means of a trowel or other applicator.

Such solvents must be inert to isocyanate group and to the other components of the composition and include esters, ketones and hydrocarbons. Specific solvents which may be used include methyl ethyl ketone, methyl isobutyl ketone, 4-methyl-4-methoxypentan-2-one, ethyl acetate, butyl acetate, ethoxyethyl acetate, cyclohexanone, toluene and xylene.

The proportions of the different ingredients used in making up the compositions may be varied widely. Thus per 100 parts by weight of cement there may be used from 5 to 900 parts by weight of the filler, from 10 to 75 parts by weight of water, from 5 to 5000 parts by weight of resin-forming components, defined as organic polyisocyanate plus organic polyfunctional isocyanate-reactive compounds and from 0 to 200 parts by weight of solvents. Preferred quantities are from 10–600 parts of filler, 20–50 parts of water, 10–4000 parts of urethane resin and 0–100 parts of solvent, although it has been found that as little as 1 part of water per 100 parts of the hydraulic cement may be used in making up the said composition. Generally, from 3 to 50 parts of water per 100 parts of cement may be used. By reducing the amount of water in the compositions there is less shrinkage when the compoitions cure and harden.

After the composition has been applied to a surface it must be allowed to harden sufficiently for surface-grinding to be carried out, although it is not essential to wait until curing is complete. It is convenient to allow the composition to harden overnight. The rather rough surface then obtained is ground flat and smooth using similar techniques to those employed for grinding and finishing conventional terrazzo floors. Although intended primarily for flooring applications, the compositions may also be applied to curved or inclined surfaces provided that the compositions are sufficiently viscous to remain on such surfaces while hardening proceeds. The process of the invention may also be used to manufacture decorative tiles, either by casting and surfacing individual tiles or by cutting up a large area of hardened composition into tile-sized pieces.

After the surface of the composition has been ground to expose the filler, there may be applied to the ground surface one or more coats of a urethane surface-coating composition, which may be of the one-pack or two-pack type.

The compositions may be applied to the surface to be coated in any desired thickness, but will normally not be less than ⅛ inch thick.

The invention is illustrated but not limited by the following examples in which parts and percentages are by weight.

EXAMPLE 1

100 parts of portland cement, 20 parts of an oxypropylated glycerol having a molecular weight of approximately 1000, 8 parts of an oxypropylated triethanolamine having a molecular weight of approximately 320, 30 parts of a triple roll mill base consisting of 20 parts of titanium dioxide and 10 parts of a polyester resin (prepared from hexanetriol, 1,3-butanediol and adipic acid and having a hydroxyl value of approximately 160 mg. KOH/g.), 25 parts of water and 136 parts of mixed red and blue mass pigmented nylon 6,6 polymer chips (approximately ¼ inch (0.635 cm.) diameter) are all mixed together and when an even mixture has been obtained 100 parts of a 70% solution of a polyisocyanate (obtained as described below) are added with further mixing until evenly dispersed. The fluid mixture is then poured out and spread into a layer ½ inch (1.27 cm.) thick, when it sets rapidly to a stage where it is firm enough to walk on in 1–1½ hours.

After allowing the composition to cure overnight it is ground flat and smooth using mechanical grinding equipment of the type which is normally used in the making of conventional terrazzo floors. The grinding process exposes the coloured plastic chips which are embedded in the contrasting coloured base material, thereby producing a decorative effect.

The polyisocyanate solution which is used in this example is obtained by heating a mixture of tolylene diisocyanate (1 mole), trimethylolpropane (0.197 mole) and butylene glycol (1.159 mole) for 2 hours at 60° C. in the presence of half their combined weight of a 1:1 mixture of β-ethoxyethyl acetate and xylene. 0.029 mole of an oxypropylated glycerol of molecular weight 3000 is added and heating is continued for 4 hours at 60° C. Sufficient xylene is then added to give a solution having a 70% solids content.

EXAMPLE 2

100 parts of portland cement, 13 parts of an oxypropylated glycerol having a molecular weight of approximately 1,000, 8 parts of an oxypropylated glycerol having a molecular weight of approximately 320, 21 parts of a triple roll mill base consisting of 14 parts of titanium dioxide and 7 parts of a polyester resin (prepared from hexanetriol, 1,3-butane diol and adipic acid and having a hydroxyl value of approximately 160 mgm. KOH/g.) 25 parts of water and 0.5 part of a 10% solution of dibutyl tin dilaurate in xylene and 50 parts of mass pigmented nylon 6.6 polymer chips (approximately ¼ inch (0.635 cm. diameter) are all mixed together and when an even mixture has been obtained 70 parts of a 75% solution in ethyl glycol acetate/xylene (1:1) of a reaction product of hexamethylene diisocyanate, trimethylolpropane and 1,3-butane diol having an isocyanate content of about 12% are added with further mixing until evenly dispersed. The fluid mixture is then poured out and spread into a layer ½ inch (1.27 cm.) thick when it sets to a stage where it is firm enough to walk on in approximately 6 hours.

After allowing the composition to cure overnight it is ground flat and smooth using grinding equipment of the type which is normally used in the making of conventional terrazzo floors. The grinding process exposes the coloured polymer chips which are embedded in the contrasting coloured base material thereby producing a decorative effect.

The surface may then be left as it is or sealed with one, two or three coats of a one- or a two-pack urethane lacquer as desired.

EXAMPLE 3

The procedure described in Example 2 is repeated using 28 parts of 3-isocyanato-methyl-3,5,5-trimethylcyclohexyl-isocyanate in place of the 70 parts of the hexamethylene - diisocyanate trimethylolpropane, 1,3 - butane diol reaction product when a liquid mix is obtained which sets firm enough to walk on in approximately 10 hours.

EXAMPLE 4

100 parts of white portland cement, 13 parts of an oxypropylated glycerol having a molecular weight of approximately 1000, 8 parts of an oxypropylated glycerol having a molecular weight of approximately 320, 21 parts of a triple roll mill base consisting of 14 parts of titanium dioxide and 7 parts of a polyester resin (prepared from hexanetriol, 1,3-butane diol and adipic acid and having a hydroxyl value of approximately 160 mgm. KOH/g.) 25 parts of water, 0.5 parts of a 10% solution of dibutyl tin dilaurate in xylene and 150 parts of marble chips of approximately ¼ inch (0.635 cm.) diameter are all mixed together and when an even mixture has been obtained 28 parts of 3-isocyanatomethyl-3,5,5-trimethylcyclohexyl isocyanate are added with further mixing until evenly dispersed.

The fluid mixture is then poured out and spread into a layer ½ inch (1.27 cm.) thick when it sets to a stage where it is firm enough to walk on in approximately 10 hours.

After allowing the composition to cure overnight it is ground flat and smooth using grinding equipment of the type which is normally used in the making of conventional terrazzo floors. The grinding process exposes the marble chips which are embedded in the contrasting base material thereby producing a decorative effect.

The surface may then be left as it is or sealed with one, two or three coats of a one or two pack urethane lacquer as desired.

EXAMPLE 5

150 parts of white portland cement, 50 parts of castor oil hard resin reaction product (obtained as described below), 30 parts of water, 0.3 part of dibutyl tin dilaurate and 500 parts of a graded coloured glass and stone aggregate mixture with particle sizes of 200 B.S. sieve (0.0076 cm.) up to ⅟₁₆ inch (0.16 cm.) are mixed together, 40 parts of 3-isocyanatomethyl-3,5,5-trimethylcyclohexyl isocyanate are then added and mixed in until evenly dispersed. On spreading out the composition into a layer ½ inch (1.27 cm.) thick, it hardens and is capable of taking foot traffic after approximately 10 hours. The surface is ground smooth after 24 hours and sealed with a one or two pack urethane lacquer if desired.

The castor oil/hard resin reaction product using in this example is prepared by the following method:

320 parts of 1st pressing castor oil are heated together with 80 parts of an esterified rosin-modified phenol formaldehyde resol resin at 240° C. for 45 minutes. The latter ingredient is the glycerol ester of the product from the reaction between rosin and a diphenylolpropane-formaldehyde resol resin.

EXAMPLE 6

150 parts of white portland cement, 100 parts of an oxypropylated glycerol having a hydroxyl value of approximately 55 mg. KOH/g., 10 parts of an oxypropylated glycerol having a hydroxy value of approximately 540 mg. KOH/g. 30 parts of water, 125 parts of mass-pigmented 6,6 nylon polymer chips (approximately ¼ inch (0.635 cm.) in diameter), 400 parts of a graded coloured glass and stone aggregate mixture with particle sizes of 200 B.S. sieve (0.0076 cm.) up to ⅟₁₆ inch (0.16 cm.) and 0.3 part of dibutyl tin dilaurate are mixed together until an even mixture has been obtained. 50 parts of 3-isocyanatomethyl-3,5,5-trimethylcyclohexyl isocyanate are then added and when this component has been evenly dispersed the composition is spread into a layer ½ inch (1.27 cm.) thick, when it sets to a stage where it is hard enough to take foot traffic after approximately 12 hours. After 24 hours the surface is ground smooth and, if desired, sealed with a one or two pack urethane lacquer.

EXAMPLE 7

The procedure described in Example 4 is repeated, except that the 100 parts of white portland cement are replaced by 100 parts of ordinary portland cement, and the 28 parts of 3-isocyanatomethyl-3,5,5-trimethylcyclohexyl isocyanate are replaced by 70 parts of a 75% solution in ethyl glycol acetate/xylene (1:1) of a reaction product of a mixture of 2,2,4 and 2,4,4-trimethylhexamethylene diisocyanates, trimethylol-propane and 1,3-butane diol having an isocyanate content of approximately 11%. The composition so obtained, when spread out into a layer ½ inch (1.27 cm.) thick, sets to provide a surface which is firm enough to walk on after 8 to 9 hours.

What I claim is:
1. A process for the manufacture of decorative flooring surfaces which comprises applying to the floor to be surface a composition having as essential ingredients a hydraulic cement, a filler in the form of fragments or coarse particles comprising a polymeric material selected from the group consisting of nylon, polyethylene terephthalate, polyurethanes, urea/formaldehyde polymers, phenol/formaldehyde polymers and melamine/formaldehyde polymers, water and an organic polyisocyanate, allowing the composition to harden and when grinding the surface of the composition to expose the fragments or particles of filler.

2. A process as claimed in claim 1 wherein the hydraulic cement is selected from the group consisting of portland cement, rapid hardening cements, low-heat cements, sulphate-resisting cements, portland blast-furnace cement, masonry cements, natural cements, lime cements, selenitic cement, Pozzolanic cement and calcium sulphate cements.

3. A process as claimed in claim 1 wherein the composition contains in addition an isocyanate-reactive organic compound.

4. A process as claimed in claim 3 wherein the isocyanate-reactive organic compound is a dihydric or trihydric polyether having an equivalent weight of from 100 to 1500.

5. A process as claimed in claim 3 wherein the isocyanate-reactive organic compound is the reaction product of castor oil with a hard resin which is a rosinate of a metal selected from Group IIa of the Periodic Table or a condensation product of rosin with
   (i) at least one polyhydric alcohol, or
   (ii) at least one polyhydric alcohol and at least, or one optionally substituted phenol/formaldehyde resol resin
   (iii) at least one polyhydric alcohol and at least one α,β-unsaturated dicarboxylic acid or the anhydride thereof.

6. A process as claimed in claim 1 wherein the composition contains in addition pigments, sand, fine particle-size fillers or bitumen.

7. A process as claimed in claim 1 wherein the composition also contains a solvent which is inert towards isocyanate groups.

8. A process as claimed in claim 1 wherein as filler there are used fragments of mass-pigmented plastic materials.

9. A process as claimed in claim 1 wherein the organic polyisocyanate is an aliphatic, araliphatic or cycloaliphatic polyisocyanate.

10. A process as claimed in claim 1 wherein the composition comprises, per 100 parts by weight of cement, from 5 to 900 parts by weight of the filler, from 10 to 75 parts by weight of water, from 5 to 5000 parts by weight of resin-forming components, comprising the polyisocyanate and organic isocyanate-reactive compound and from 0 to 200 parts by weight of solvent.

11. A process as claimed in claim 10 wherein the composition comprises portland cement, pigmented nylon chips as the filler, water and a polyisocyanate which is the reaction product of tolylene diisocyanate or hexamethylene diisocyanate, trimethylol propane and butylene glycol.

References Cited

UNITED STATES PATENTS

| 2,491,487 | 12/1949 | Faulwetter | 106—90 |
| 2,902,388 | 9/1959 | Szukiewicz | 106—90 |
| 3,155,529 | 11/1964 | Paturzo | 117—8 |

FOREIGN PATENTS

| 2,008,417 | 1/1970 | France | 106—90 |
| 1,992,864 | 5/1970 | Great Britain | 106—90 |

ALFRED L. LEAVITT, Primary Examiner
M. F. ESPOSITO, Assistant Examiner

U.S. Cl. X.R.
106—90, 97; 117—26, 64 R, 161 KP, 168